United States Patent [19]

Branscome

[11] Patent Number: 5,624,077

[45] Date of Patent: Apr. 29, 1997

[54] CONCRETE CYCLONE RECLAIMER

[75] Inventor: Henry S. Branscome, Williamsburg, Va.

[73] Assignee: Henry Mfg. Co., Williamsburg, Va.

[21] Appl. No.: 418,459

[22] Filed: Apr. 7, 1995

Related U.S. Application Data

[63] Continuation-in-part of Ser. No. 315,624, Sep. 30, 1994, Pat. No. 5,540,395.

[51] Int. Cl.[6] .................... B02C 19/00; B02C 19/12
[52] U.S. Cl. .................... 241/20; 241/24.1; 241/39; 241/41; 241/72; 241/74; 241/79.3
[58] Field of Search ................. 241/24.1, 20, 29, 241/39, 41, 72, 74, 79, 79.1, 79.2, 79.3

[56] References Cited

U.S. PATENT DOCUMENTS

| | | |
|---|---|---|
| 1,378,623 | 5/1921 | Schaffer . |
| 1,458,387 | 6/1923 | Bourne . |
| 1,461,067 | 7/1923 | Moser . |
| 1,577,136 | 3/1926 | Markman . |
| 2,174,836 | 10/1939 | Range . |
| 2,942,731 | 6/1960 | Soldini . |
| 2,983,378 | 5/1961 | Hilkemeier . |
| 3,181,842 | 5/1965 | Eckert . |
| 4,127,478 | 11/1978 | Miller ................. 209/240 |
| 4,140,629 | 2/1979 | Martindale .......... 209/240 |
| 4,236,999 | 12/1980 | Burgess et al. ...... 209/250 |
| 4,267,980 | 5/1981 | Lapoint ............... 241/20 |
| 4,418,871 | 12/1983 | Powell ................. 241/1 |
| 4,616,786 | 10/1986 | Riker .................. 241/35 |
| 5,082,553 | 1/1992 | Tanii ................... 209/3 |
| 5,108,584 | 4/1992 | Brosseuk .............. 209/44 |
| 5,234,172 | 8/1993 | Chupka et al. ....... 241/301 |
| 5,312,051 | 5/1994 | Preisser .............. 241/1 |
| 5,540,395 | 7/1996 | Branscome .......... 241/39 |

OTHER PUBLICATIONS

Advertisement for a HAAHJEM Roto–Reclaimer from "Ready Mix—A Pit & Quarry Publication," P. 1, Mar./Apr. 1994.

*Primary Examiner*—John M. Husar
*Attorney, Agent, or Firm*—Greenblum & Bernstein P.L.C.

[57] ABSTRACT

The present invention is a novel concrete reclaimer cylinder with a closed chamber and a screen chamber. The reclaimer is disposed in a non-horizontal position such that screen chamber is positioned lower than the closed chamber and driven to rotate. Concrete product is received into the closed chamber at its receiving end and is washed with water to produce cement slurry. The cement slurry flows out of the closed chamber at the receiving end leaving a mixture of sand and gravel in the closed chamber. The sand and gravel mixture is advanced through the closed chamber by eight triangular blades. Each blade is planar in shape, with a screen portion disposed within each blade face, with a perpendicular portion extending from the front edge to direct the sand and gravel mixture through an aperture and into the screen chamber. The sand and gravel mixture is received in a rotating screen and washed by high pressure spray to separate the two constituents. The sand permeates the rotating screen while the gravel remains inside the rotating screen. The cement slurry, sand and gravel are collected in separate containers for future use.

12 Claims, 6 Drawing Sheets

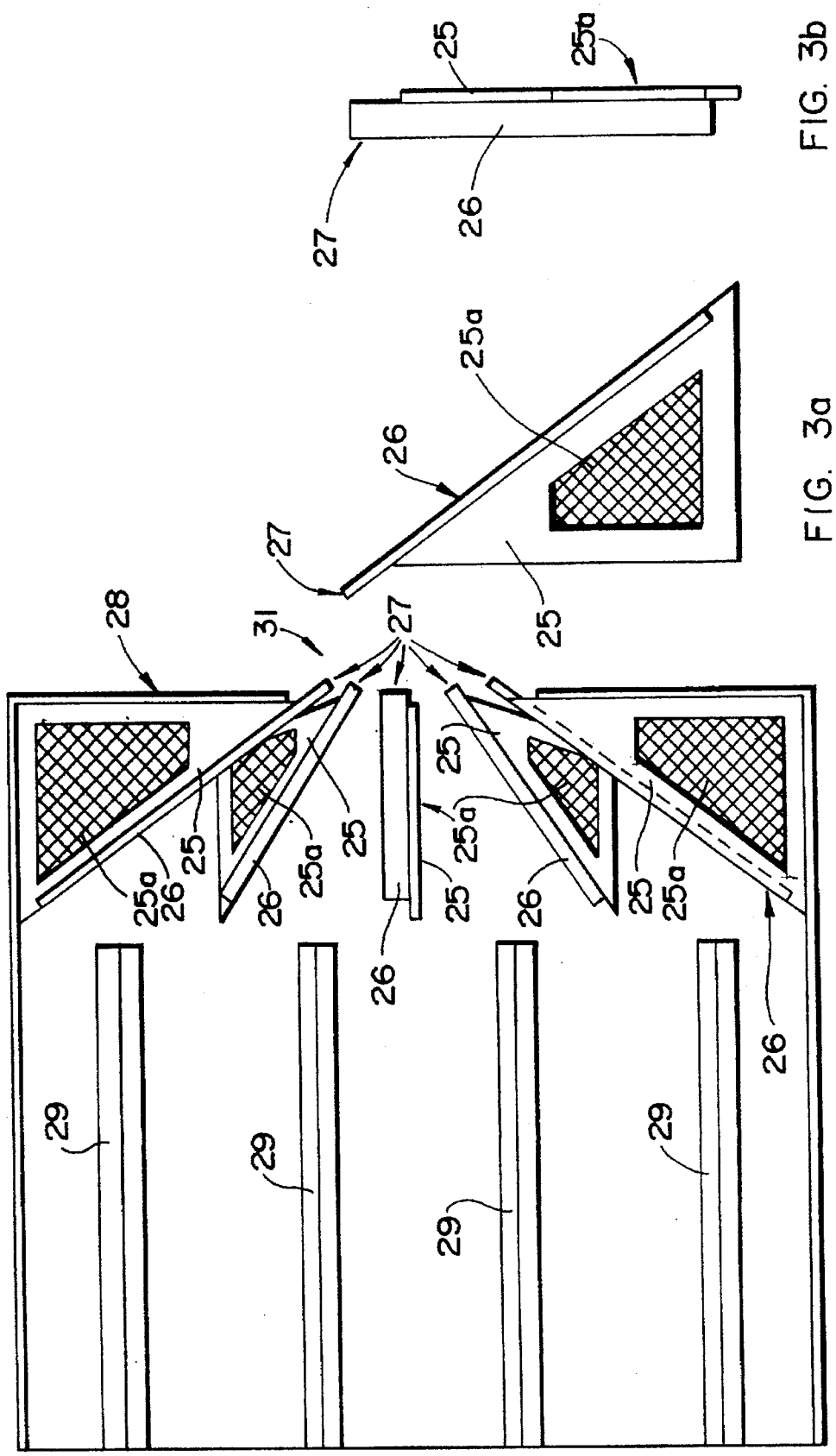

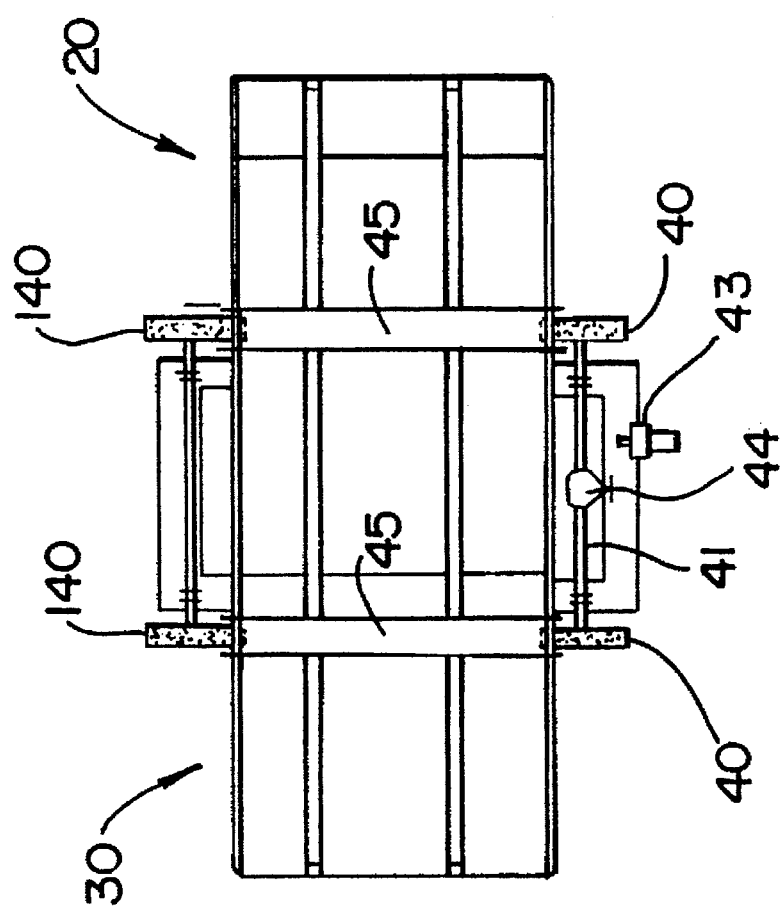

CONCRETE CYCLONE RECLAIMER

BACKGROUND OF THE INVENTION

1. Field of the Invention

The present invention is a continuation-in-part of BRANSCOME, U.S. Ser. No. 08/315,624, filed Sep. 30, 1994, now U.S. Pat. No. 5,540,395 entitled "CONCRETE CYCLONE RECLAIMER" and the same is incorporated herein by reference in its entirety, and relates to the structure and method of concrete reclaiming. The instant invention allows the user to easily separate cement slurry, sand, and gravel from mixed concrete for future use.

2. Description of Background Information

It is known to breakdown mixed concrete into its constituent parts of cement slurry, sand, and gravel. It is also well known to employ rotating screens or trommels for filtering and separating different sized granules of sand and gravel within the reclaimer. Some reclaimers employ a screw type conveyor for advancing product through a reclaimer cylinder or chamber and some other reclaimers use only the force of gravity to advance the mixed concrete product.

In screw type conveyor reclaimers, the screw conveyor is required to extend along the entire length of the reclaimer cylinder. In the screen chambers of such reclaimers, there is a likelihood of clogging or jamming due to the hard granular pieces of sand or gravel becoming wedged between the advancing blades of the screw conveyor and the screen.

Additionally, screw type conveyor reclaimers are inefficient because they work against the force of gravity. Screw conveyors force the product up and through the reclaimer cylinder or chambers instead of allowing the force of gravity to efficiently move the product therethrough.

When certain known reclaimers employ only the force of gravity for advancing mixed concrete product through the reclaimer chamber, several screen chambers or trommels are required for filtering and separating each of the constituent parts from the mixed concrete product. Such reclaimers may also allow too much product into the reclaimer chamber because there is no way to regulate the flow of product through the cylinder. In this event, the forces of gravity may pull the concrete mixture, including fine granular parts, past the screen chamber specifically intended for filtering and separating those fine granules from the remaining mixture. Thus, the separated constituent parts of the concrete mixture will contain unintended elements, i.e., sand granules may be inadvertently filtered and separated as gravel.

PREISSER, U.S. Pat. No. 5,312,051, discloses a declining reclaimer apparatus with a plurality of rotating screens of increasing mesh size. As shown in FIGS. 1 and 2, fresh concrete poured into the upper inclined end 22 of the reclaimer migrates to the lower declined end. As the concrete runs through the plurality of rotating screen chambers 14a, 14b, the concrete mixture is separated into cement slurry A, sand S, and gravel G. This device requires separate screens for the cement slurry A and sand S. Gravel G is discharged through the end of the reclaimer. Because this particular apparatus provides no means for regulating the admission of mixed concrete into the opening 22, too much concrete may be in chambers 14a, 14b resulting in improper filtration or separation. This improper result is due to the pull of gravity on the concrete product through the particular screen chambers before the product is fully filtered.

TANII, U.S. Pat. No. 5,082,553, discloses a concrete reclaimer apparatus that moves the mixed concrete product through the device by a screw type conveyor means. FIG. 3 shows that the device requires a screw conveyor 16 to move the mixed concrete into the screen chamber 9. Another screw conveyor 24 is required to move the product through the screen chamber 9 and to discharge reclaimed gravel into chute 26a, 26b. A third screw conveyor 27 is required to discharge the sand 18 into chute 30a, 30b. This device suffers from the same drawbacks as other screw conveyor type reclaimers in that the device may become clogged or jammed. While this particular device provides a method and means for jam relief, this device is unable to avoid the jam and, therefore, suffers from the inescapable possibility of jamming or clogging while in operation. This device also suffers from inefficient operation in that it works against the force of gravity by pushing the concrete mixture through the reclaimer by screw conveyor means 16, 24, 27.

MILLER, U.S. Pat. No. 4,127,478, discloses an inclined concrete reclaimer. FIG. 1 shows the mixed concrete product inserted into chute 18. The product is advanced upward and through the reclaimer by screw conveyor 22 past screens 26, 27. The screens 26, 27 filter fine and coarse sand granules. This device suffers from a propensity to clog or jam. Also, this device is wholly inefficient. Not only does this device push product through the reclaimer, but it pushes the product upward against the force of gravity. MILLER also provides a means for rotating the reclaimer in which drive wheels 20 are disposed on either side of the lower declined end of the reclaimer. On the upper inclined end are disposed a pair of idler wheels 21. This arrangement is inefficient. The drive wheels 20 are required not only to rotate the reclaimer chamber 19, but also to advance the concrete product upward against the force of gravity.

HILKEMAIER, U.S. Pat. No. 2,983,378, discloses an inclined concrete reclaimer requiring only one screen to separate the mixed concrete into its constituent parts of cement slurry, sand and gravel. FIG. 2 shows the reclaimer apparatus in which a screw conveyor 15, 16 is employed to push the mixed concrete up and through the screen chamber 26 and discharge end 8. This device suffers from the same inefficiency and propensity to clog or jam as noted with reference to the other screw type inclined concrete reclaiming apparatuses.

SUMMARY OF THE INVENTION

One object of the present invention is to provide a concrete reclaimer apparatus that employs unique product advancing blades for moving the mixed concrete product through the reclaimer chamber.

Another object of the present invention is to provide a reclaimer apparatus that additionally enlists the aid of gravity for advancing the mixed concrete product through the reclaimer chamber.

Another object of the present invention is to provide a concrete reclaimer apparatus that requires only one rotating screen for filtering and separating the mixed concrete into its constituent parts of cement slurry, sand, and gravel.

Another object of the present invention is to provide a reclaimer apparatus that may include a high pressure spray nozzle within the screen chamber to facilitate the filtration and separation of the concrete product.

Yet another object of the present invention is to provide a system for filtering and separating mixed concrete into its constituent parts through the combined use of unique product advancing blades and gravity.

Yet another object of the present invention is to provide a concrete reclaimer apparatus that may include a pair of drive wheels disposed on a common side of the reclaimer device and a pair of idler wheels disposed on another common side opposite the drive wheels.

Still another object of the present invention is to provide a reclaimer apparatus which may include drive wheels connected by an common axle and rotated by a differential gear, the differential gear being driven by an electric motor connected thereto.

A further object of the present invention is to provide a novel concrete reclaimer cylinder that includes a closed chamber and a screen chamber. The reclaimer is disposed in a non-horizontal position such that screen chamber is positioned lower than the closed chamber. The reclaimer will be driven to rotate. Concrete product, received into the closed chamber at its receiving end, will be washed with water to produce cement slurry. The cement slurry flows or drains out of the closed chamber at the receiving end, leaving a mixture of sand and gravel in the closed chamber. The sand and gravel mixture is advanced through the closed chamber by eight unique triangular blades. Each blade is provided with a screen portion and may be planar in shape, with a perpendicular portion extending from the front edge to direct the cement slurry through the screen portion and the sand and gravel mixture through an aperture and into the screen chamber. The sand and gravel mixture is received into a rotating screen and washed by a high pressure spray to separate the two constituents. The sand permeates the rotating screen while the gravel remains inside the rotating screen.

Another aspect of the present invention is directed to a concrete reclaiming method for separating concrete into its constituent parts. The method includes the steps of feeding concrete into a rotating closed chamber oriented in a non-horizontal position, the non-horizontal position enabling the mixture egress through the closed chamber by the force of gravity, producing a cement slurry in the closed chamber by the addition of water to the cement, draining the cement slurry out of the closed chamber leaving a mixture of sand and gravel, and rotating a plurality of blades about a center-point of the closed chamber. The method also provides for further separating of the cement slurry from the sand and gravel through a screen portion in each of the plurality of blades. The sand and gravel mixture is advanced by the rotating of the plurality of blades, and the force of gravity, directing the mixture through an aperture into a screen chamber with a rotating screen, the mixture then being subjected to a high pressure wash. The high pressure wash and rotation of the screen chamber result in sand particles permeating the screen and gravel chunks remaining in the screen chamber. The gravel is discharged from the screen chamber and the cement slurry, the sand and the gravel are collected in separate containers.

Other objects and advantages of the present invention and advantageous features thereof will become apparent as the description of the invention proceeds herein.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein:

FIGS. 3a and 3b are a side and front view of the blades of the concrete reclaimer;

FIG. 4 is a sectional view illustrating the closed drum chamber and its blade configuration;

FIG. 5 is a bottom view of the concrete reclaimer showing the rotational driving system;

DETAILED DESCRIPTION OF THE PREFERRED EMBODIMENTS

Figure 1:
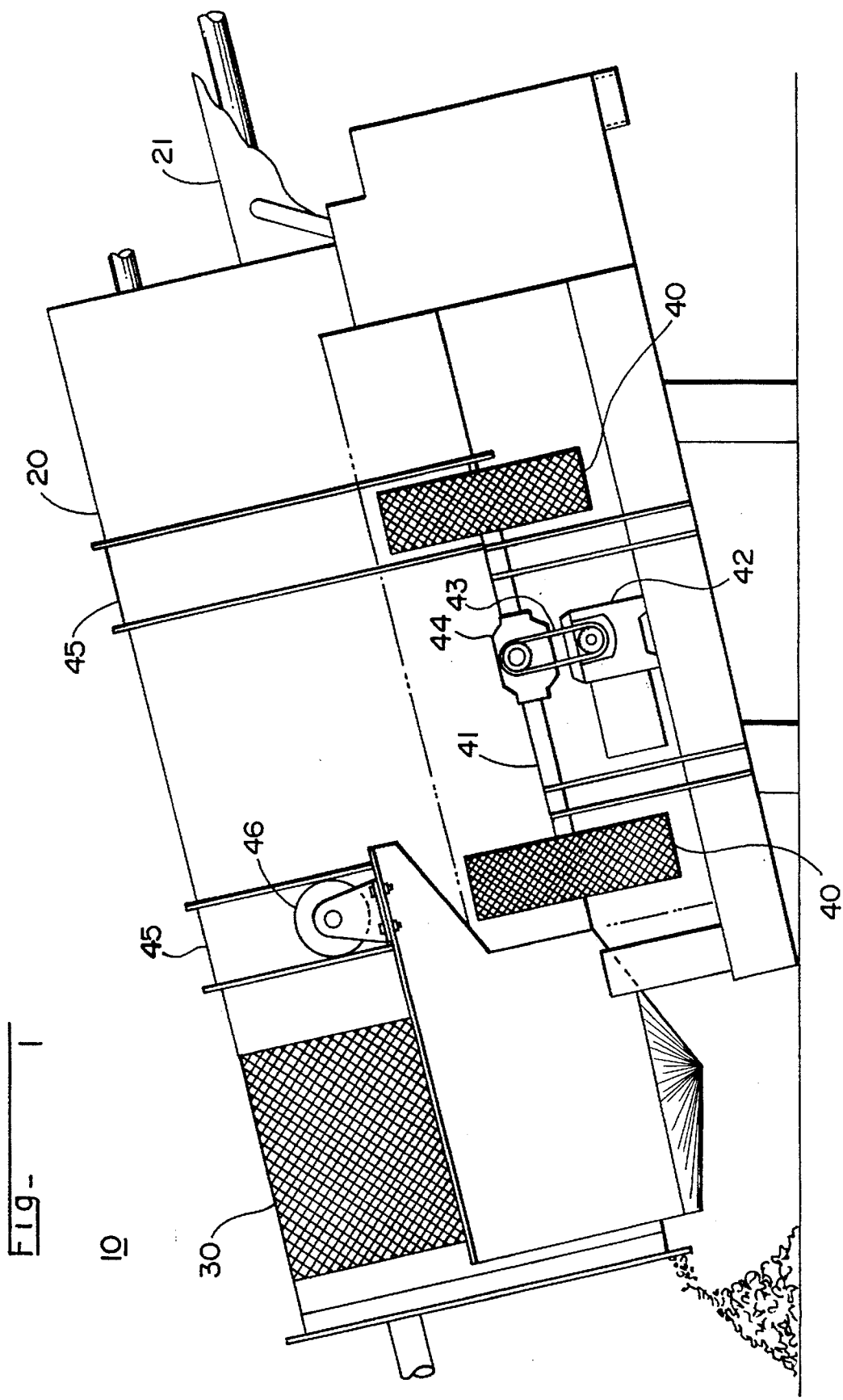
FIG. 1 is a side view of the concrete reclaimer.

Referring now to the drawings in detail, FIG. 1 shows a side view of a cylindrical concrete reclaimer apparatus 10 oriented in a non-horizontal position. The reclaimer apparatus 10 is comprised of closed drum chamber 20 and screen chamber 30. A pair of drive wheels 40, connected by a common axle 40, are positioned within wheel guides 45 and located on one side of the reclaimer 10. The common axle 40 includes a differential gear 44 coupled to an electric motor 42 through a chain belt 43. At least one thrust or guide roller 46 is also disposed within wheel guide 45.

The rotational driving system of the reclaimer 10 is shown in FIG. 5. The reclaimer 10 is positioned upon the pair of drive wheels 40, disposed on one side of the reclaimer, and a pair of idler wheels 140, disposed on the opposite side of the reclaimer. Drive wheel guides 45 are disposed about the outer circumference of reclaimer 10 to receive the drive wheels 40 and idler wheels 140. The drive wheels 40 and the idler wheels 140 contact the outer surface of reclaimer cylinder 10, and impart a rotational force thereto by engaging the drive wheels 40 and by the frictional force between the drive wheels 40 and the wheel guides 45.

Figure 7:
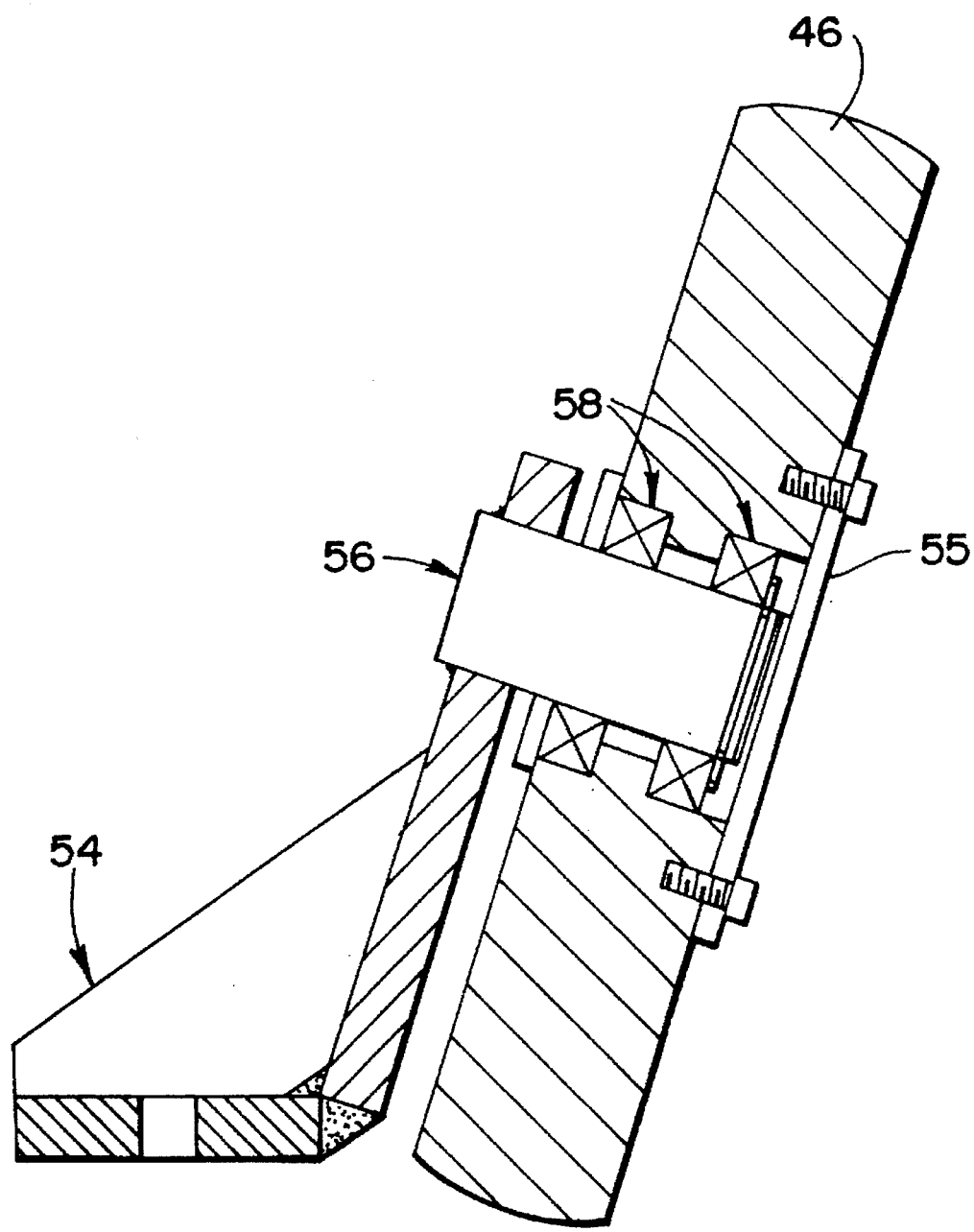
FIG. 7 is a sectional view of the guide roller.

To impart a rotational force on the reclaimer 10, about a fixed center axis, the electric motor 42 drives drive wheels 40. Chain belt 43, coupling the electric motor 42 to the differential gear 44, synchronously drives the differential gear with electric motor 42. As the differential gear 44 is driven by electric motor 42, differential gear 44 drives axle 41 to rotate, thus driving drive wheels 40. The differential gear and axle may be from, or similar to, a vehicle drive train. The frictional contact between rotation of drive wheels 40 and drive wheel guides 45 cause the reclaimer 10 to begin rotating in a direction opposite to the rotation of the drive wheels 40. Idler wheels 140, disposed on the opposite side of the reclaimer 10 from drive wheels 40, are provided for supporting the reclaimer 10 during rotation. While the reclaimer 10 is being driven to rotate, thrust or guide roller 46, disposed within drive wheel guide 45, inhibits any longitudinal movement of the reclaimer 10 but does not affect rotation. As illustrated in FIG. 7, the thrust or guide roller 46 may be mounted on a bracket 54. An axle 56 is mounted to bracket 54 such that the thrust or guide roller 46 is mounted at a predetermined angle and rotates about axle 56 on ball bearings 58. The predetermined angle at which thrust or guide roller 46 is mounted is selected such that thrust or guide roller 46 is disposed within the drive wheel guide 45 to inhibit longitudinal motion of the reclaimer 10.

Figure 2:
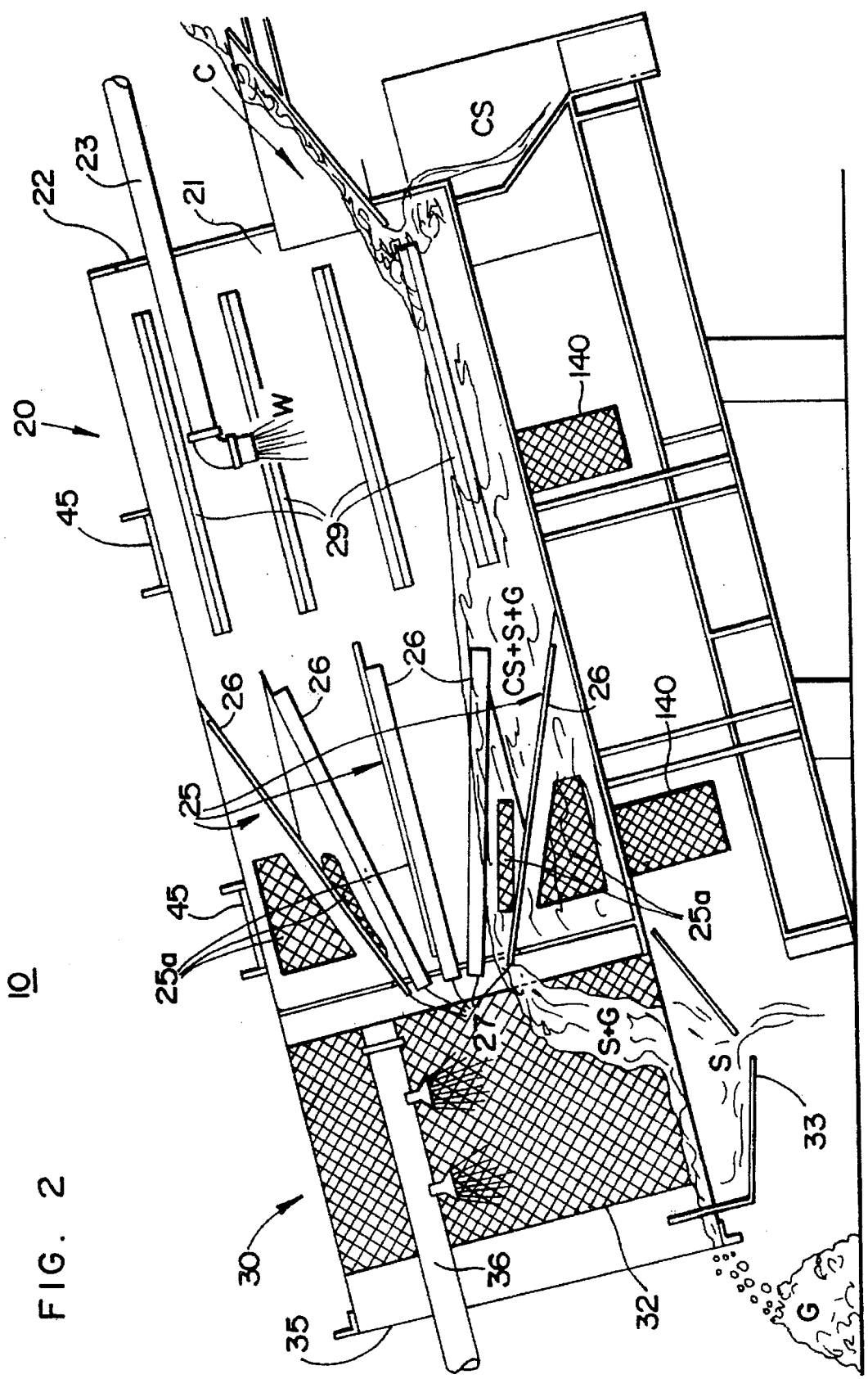
FIG. 2 is a sectional view illustrating the internal configuration of the concrete reclaimer.

FIG. 2 shows an sectional side view of the interior of concrete reclaimer cylinder 10. The reclaimer cylinder 10 is comprised of closed drum chamber 20 and screen chamber 30. The reclaimer cylinder 10 is disposed in a non-horizontal position such that the closed drum chamber 20 is disposed at a level higher than the screen chamber 30. The mixed concrete product C is inserted into a rotating reclaimer cylinder 10. Thus, as the mixed concrete product C is dispensed into the rotating closed drum chamber 20, the force of gravity will aid and cause the product to gravitate toward and through the screen chamber 30.

An in-feed chute 21 is disposed at an opening 22 of chamber 20 for receiving mixed concrete C. A water pipe 23 is also disposed in opening 22 for adding water W to the mixed concrete C in chamber 20. As the mixed concrete C and water W combine in chamber 20, cement slurry CS is created and separated from the sand and gravel. The cement slurry CS floats above the sand and gravel in closed drum chamber 20 and flows, or drains, out of the chamber 20 through opening 22. The cement slurry CS is collected in a slurry discharge pipe 24.

Inside chamber 20 are disposed a plurality of blades 25 for advancing the sand and gravel mixture through an aperture 31 into screen chamber 30. A screen portion 25a, with a predetermined grade which will allow cement slurry to pass, but not sand or gravel, is disposed in each blade face. This enables further separation of the cement slurry from the sand and gravel. The screen portion 25a, by allowing the cement slurry to pass therethrough, keeps the cement slurry that has not yet flowed off into slurry discharge pipe 24 within the closed drum chamber 20 and does not inadvertently pass the cement slurry into the screen chamber 30, thus, ensuring complete separation of the cement slurry from the sand and gravel granules.

Aperture 31 is an opening provided in a separating wall 28 that separates closed drum chamber 20 and screen chamber 30. Each blade 25 is substantially triangular in shape as shown in FIGS. 3a, 3b, and 4. Blade 25 includes a substantially right triangle. The surface of the blade 25 is substantially planar, with the screen portion 25a disposed therein to further separate the cement slurry from the sand and gravel. A perpendicular "L" portion 26 extends from the front edge (hypotenuse) of blade 25 to scoop the sand and gravel mixture and direct the mixture through aperture 31. The tip 27 of blade 25 penetrates the aperture 31. The leg of triangular blade 25 connected to tip 27 is mounted on separating wall 28 and the other leg of blade 25 is mounted on the inside wall of closed drum chamber 20. An elongated wedge member 29 extends along the interior surface of the closed drum chamber 20. The elongated wedge member 29 continuously mixes the concrete product during the reclaiming process.

Figure 6:
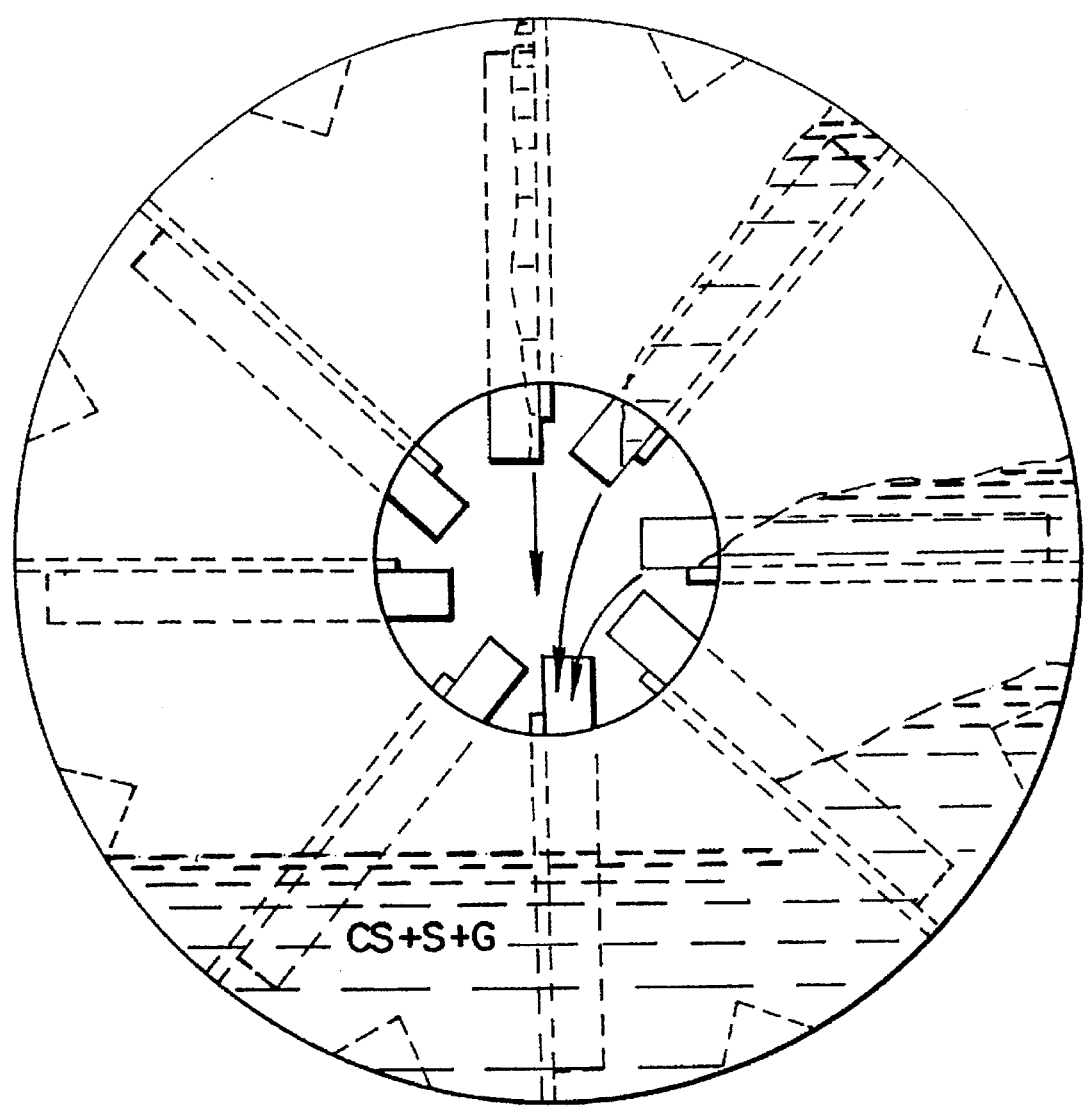
FIG. 6 is view of the separating wall, aperture, and blade arrangement of the closed drum chamber from the perspective of the screen chamber.

FIG. 6 shows a view of the closed drum chamber 20 from the perspective of the screen chamber 30. FIG. 6 further shows the arrangement of the blades 25 and the perpendicular "L" portions 26 extending therefrom for collecting the sand and gravel from the closed drum chamber 20 and delivering the same to the screen chamber 30 through aperture 31 in separating wall 28. The arrows indicate the sand and gravel mixture being directed through aperture 31 and into screen chamber 30. Elongated wedge members 29 for continuously mixing the concrete product are also shown.

With reference to FIG. 6, as the closed drum chamber 20 is rotated, the plurality of blades 25 are rotated about the center axis of the closed drum chamber 20. The rotation causes a blade 25 to be brought into contact and dragged through the cement slurry, sand, and gravel mixture. As the blade is dragged through the watered-down concrete mixture, the cement slurry is allowed to pass through screen portion 25a while the sand and gravel are scooped up by the blade and extending arm 26. When the blade clears the cement slurry, sand, and gravel mixture, cement slurry is still allowed to pass through the screen portion 25a. The blade 25 continues rotating about the center axis of the closed drum chamber 20 and, at a certain rotational position, the force of gravity will cause the sand and gravel mixture on the blade to slide off the blade 25 and into the screen chamber 30. Because of the arrangement of blade 25 and extending arm 26, including blade tips 27 penetrating aperture 31, rotation of the reclaimer cylinder directs the sand and gravel mixture through aperture 31 of separating wall 28 and into screen chamber 30.

Referring again to FIG. 2, a discharge end 35 is provided opposite the aperture 31 at the outer end of the screen chamber 30. A high pressure spray nozzle 36 is disposed within screen chamber 30 through the discharge end 35. The high pressure spray nozzle 36 washes and dilutes the sand and gravel mixture causing the constituent parts to separate from one another in the screen chamber 30. The sand and gravel mixture is introduced into screen chamber 30 and subjected to the high pressure spray of nozzle 36, and the combination of spraying and screen chamber rotation cause the finer granules of sand S to pass through the trommel 32 while the coarser grade of gravel G remains in the screen chamber 30. The sand S is collected in the sand discharge chute 33. The gravel G, too coarse to pass through the trommel, is discharged from the reclaimer through the discharge end 35.

Thus, the present invention is able to separate concrete product into its constituent parts of cement slurry, sand, and gravel, yet requires only one rotating trommel. This provides a useful system that requires only a minimum of operating parts.

While the preferred embodiment of this invention may employ a one-quarter or one-half inch mesh screen for trommel 32, those ordinarily skilled in the art will note that other size mesh may be used depending upon the grade of sand or gravel to be separated. The mesh size for screen portion 25a is similarly selected, and may be, for example, one-half inch, so that a minimum size granule of sand desired to be separated from the cement slurry will not pass through the screen portion. Additionally, the number of blades within the closed drum chamber may be increased or decreased depending upon the particular application of the reclaimer 10, and the physical appearance of the blades may be modified to comport with the structure disclosed in parent application U.S. Ser. No. 08/315,624 , now U.S. Pat. No. 5,540,395 without departing from the spirit of the present invention.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitations. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A concrete reclaimer apparatus comprising:
   a closed chamber and a screen chamber;

said closed chamber comprising a receiving end and a plurality of blades;

each of said plurality of blades comprising a screen portion;

said screen chamber comprising a discharge end and a screen means; and said closed chamber and said screen chamber separated by an aperture.

2. The concrete reclaimer apparatus according to claim 1 wherein said apparatus being oriented in a non-horizontal position.

3. The concrete reclaimer apparatus according to claim 2 wherein said discharge end is disposed lower than said receiving end.

4. The concrete reclaimer apparatus according to claim 1 wherein said screen chamber comprises a plurality of high pressure nozzles.

5. The concrete reclaimer apparatus according to claim 1 wherein said plurality of blades penetrates said aperture.

6. The concrete reclaimer apparatus according to claim 5 wherein each of said plurality of blades are substantially planar and comprise a triangular portion; said triangular portion having a front edge.

7. The concrete reclaimer apparatus according to claim 6 wherein said blades comprise a directing means disposed perpendicular to the front edge.

8. The concrete reclaimer apparatus according to claim 1 further comprising a drive means for rotating said apparatus;

said drive means comprising a pair of drive wheels disposed on a side of said apparatus and a single axle comprising a differential gear means;

said drive wheels driven by a motor connected to said differential gear means.

9. The concrete reclaimer apparatus according to claim 1 in which cement slurry flows out through said receiving end.

10. The concrete reclaimer apparatus according to claim 1 in which sand and gravel are separated by said screen means.

11. A concrete reclaimer apparatus comprising:

a closed chamber and a screen chamber;

said closed chamber comprising a receiving end for receiving concrete product;

said closed chamber further comprising a plurality of blades;

each of said plurality of blades being substantially planar and comprising a triangular portion and a screen portion;

said triangular portion comprising a front edge and a screen portion;

said front edge comprising a directing means perpendicular thereto;

said screen chamber comprising a screen means;

said screen chamber having a discharge end for discharging gravel;

said closed chamber and said screen chamber separated by an aperture;

said apparatus disposed in a non-horizontal orientation such that said discharge end is positioned lower than said receiving end.

12. A concrete reclaiming method for separating concrete into its constituent parts, said method comprising the steps of:

feeding concrete into a rotating closed chamber oriented in a non-horizontal position;

said non-horizontal position enabling the mixture egress through the closed chamber by the force of gravity;

producing a cement slurry in the closed chamber by the addition of water to the cement;

draining said cement slurry out of the closed chamber leaving a mixture of sand and gravel;

rotating a plurality of blades about a center-point of said closed chamber, further separating said cement slurry from said sand and gravel through a screen portion in each of said plurality of blades;

said rotating the plurality of blades, and the force of gravity, directing said mixture through an aperture into a screen chamber with a rotating screen;

subjecting said mixture to a high pressure wash;

said high pressure wash and rotation of said screen chamber result in sand particles permeating said screen and gravel chunks remaining in said screen chamber;

discharging said gravel from the screen chamber;

collecting said cement slurry, said sand and said gravel in separate containers.

* * * * *